US005328738A

United States Patent [19]

McKillip et al.

[11] Patent Number: 5,328,738

[45] Date of Patent: Jul. 12, 1994

[54] METALLIZED LABEL

[75] Inventors: Barron G. McKillip, Grand Rapids, Mich.; Donald P. Klein, Dell Rapids, S. Dak.

[73] Assignee: CCL Label, Inc., Grand Rapids, Mich.

[21] Appl. No.: 2,593

[22] Filed: Jan. 11, 1993

[51] Int. Cl.[5] ........................ B32B 7/12; B32B 15/04

[52] U.S. Cl. ........................................ 428/40; 428/42; 428/343; 428/344; 428/352; 428/354

[58] Field of Search .................. 428/40, 42, 354, 344, 428/343, 352

[56] References Cited

U.S. PATENT DOCUMENTS 4,678,690 7/1987 Palmer et al. .................... 428/40 X
4,721,638 1/1988 Matsuguchi et al. ................ 428/40
4,854,610 8/1989 Kwiatek ........................... 428/40 X
4,915,994 4/1990 Begelfer .............................. 428/40
4,991,878 2/1991 Cowan et al. .................... 428/40 X
5,019,436 5/1991 Schramer et al. .................... 428/40
5,153,042 10/1992 Indrelie ................................ 428/40
5,154,956 10/1992 Fradrich .............................. 428/40

*Primary Examiner*—Daniel Zirker
*Attorney, Agent, or Firm*—Warner, Norcross & Judd

[57] ABSTRACT

A metallized label and a manufacturing method are disclosed in which a translucent base sheet is printed with markings on its rear surface, and a metal layer is applied over the printed markings. The printed markings form apertures or translucent areas through which the metal layer is visible from the front of the label. Adhesive and a release liner are applied to the rear of the metal layer. The metal layer may be applied only in areas in correspondence with the apertures.

7 Claims, 1 Drawing Sheet

METALLIZED LABEL

BACKGROUND OF THE INVENTION

1. Field of the Invention

The present invention relates to labels and, more particularly, to a metallized adhesive label and a method for manufacturing same.

2. Description of the Related Art

Labels are known in which graphical or textual indicia have a metallic appearance. As shown in FIG. 1, such a metallized label may have metallic appearing graphics 12 and text 14 on a nonmetallic or metallic background 16. Such a label may be coated on the rear surface with a pressure sensitive adhesive and backed by a release liner sheet.

The construction of a metallized label 10 according to the prior art is shown in FIG. 2. The label includes a translucent top cover sheet 18, a layer of printing 20 beneath the cover sheet, a translucent base sheet 22 beneath the cover sheet and the printing, a metallic layer 24 beneath the base sheet, a layer of pressure sensitive adhesive 26 beneath the metallic layer, and release liner 28 removably adhered to the pressure sensitive adhesive. Alternatively, a coating of varnish may be used in place of the top cover sheet 18 to protect the printing.

In the past, metallized labels according to the prior art, such as shown in FIG. 2, have been manufactured by first metallizing the rear surface of a continuous web of unprinted base sheet 22 material. Vacuum metallizing devices used for this purpose are well known in the art. The metallized rear surface of the base sheet 22 web is then coated with pressure sensitive adhesive 26, a release liner 28 web is applied over the adhesive, and the lamination is wound into a roll. The roll is then transferred to a label manufacturer where it is unwound and passed through a printing device which marks the printing 20 on the front surface of the base sheet 22. The printing 20 is applied to selected portions of the base sheet so as to leave apertures through which the metallized rear surface of the base sheet will be visible. Finally, the cover sheet 18 is adhered over the printing and the front surface of the base sheet, or a varnish coating is applied, so as to protect the printing from damage.

The metallized labels of the prior art and manufacture thereof as described above are subject to significant disadvantages insofar as both a base sheet and a cover sheet or varnish are required. The requirement for a cover sheet or varnish adds expense and complexity to the labels and manufacturing process. The label is made thicker, heavier, and less flexible by the multiple layers.

SUMMARY OF THE INVENTION

The present invention provides a metallized label which eliminates the cover sheet or varnish coating used in the prior art. According to the invention, printing is applied to the rear surface of a translucent base sheet. A metallic layer is then applied to the preprinted rear surface of the base sheet. As a result, the printing is disposed and protected between the base sheet and the metallic layer. Adhesive is applied to the rear of the metallic layer, and a release liner is applied to the adhesive.

The labels according to the invention may be made as single labels or, preferably, as a plurality of discrete labels carried on a continuous web of release liner. Furthermore, the base sheet may be metallized only in bands or zones aligned with the areas of the label to be given a metallic appearance.

These and other objects, advantages, and features of the present invention will be more fully understood and appreciated by reference to the written specification and appended drawings.

DESCRIPTION OF THE PREFERRED EMBODIMENT

Figure 1:
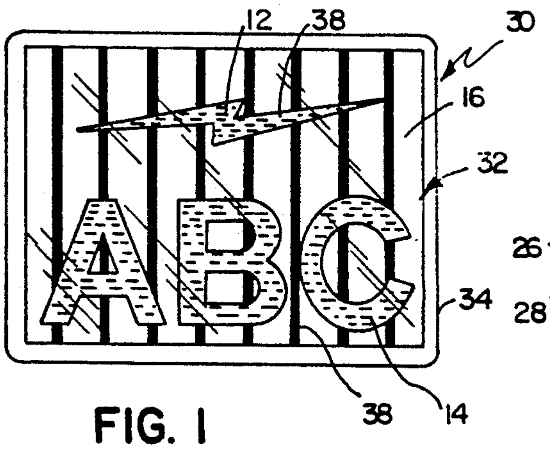
FIG. 1 is a front plan view of a metallized label according to the invention.
Figure 2:
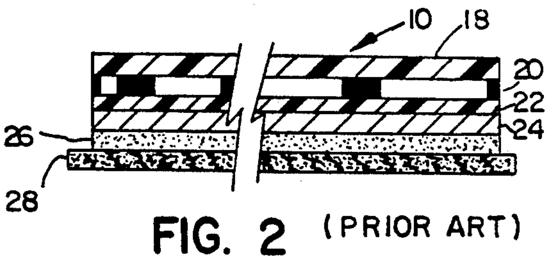
FIG. 2 (PRIOR ART)
FIG. 2 is a sectional, elevational view of a metallized label according to the prior art.
Figure 3:
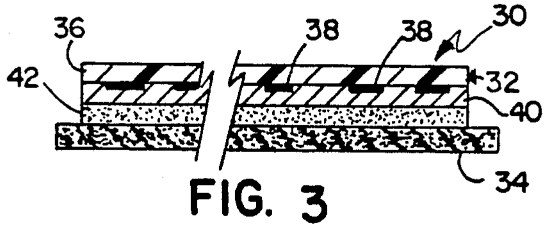
FIG. 3 is a sectional, elevational view of the label of FIG. 1.

By way of disclosing a preferred embodiment, and not by way of limitation, there is shown in FIGS. 1 and 3 a metallized label construction 30 which includes in its general organization a label 32 and a release liner 34 temporarily adhered to the rear surface of the label 32. When viewed from the front, the label exhibits graphical and textual areas 12 and 14 having a metallic appearance, such as the appearance of silver or gold, against a background 16. The label shown in the figures is illustrative of an unlimited variety of designs which may be used. For example, the background 16 may also exhibit a metallic appearance by appropriate printing as described below.

As best shown in FIG. 3, the label 32 includes a translucent base sheet 36. The base sheet may be of any well known thin, flexible materials, such as a clear PVC film. Printed markings 38 are applied to the rear surface of the base sheet. As illustrated in FIG. 3, the printed markings are opaque and form unprinted apertures through which the metallic layer 40 is visible through the front surface of the base sheet. The markings are printed in reverse so as to be properly legible from the front surface of the base sheet.

Alternatively, the printed markings may be translucent such that the metallic layer is visible through the printed markings. The printed markings may be tinted so as to impart a colored appearance to the metallic layer. For example, by using a yellow translucent ink, an aluminum metallic layer may be given a gold appearance. Regardless of whether opaque ink or translucent ink is used, the printed markings define an area or areas through which the metallic layer 40 is visible through the front surface of the base sheet.

Metallic layer 40 is applied to the rear surface of the base sheet 36 and the printed markings 38 such that the printed markings are disposed and protected between the base sheet 36 and the metallic layer 40. Pressure sensitive adhesive 42 is coated on the rear surface of the metallic layer 40. Release liner 34 is temporarily adhered to the rear surface of the pressure sensitive adhesive 42. Thus, the label according to the invention eliminates the need for an additional cover sheet or varnish coat while still protecting the printing.

Figure 4:
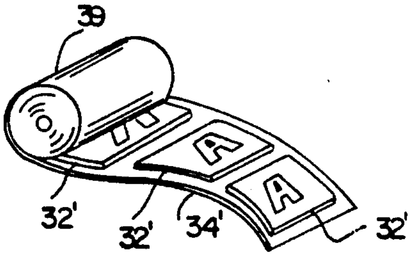
FIG. 4 is a perspective view of metallized labels according to the prior art carried on a continuous web.

As shown in FIG. 4, labels according to the invention may be provided in the form of a roll 39 of a series of labels 32′ carried on a continuous release liner web 34′. In roll form, the labels may be conveniently applied to articles by automated labelling machinery.

Figure 5A:
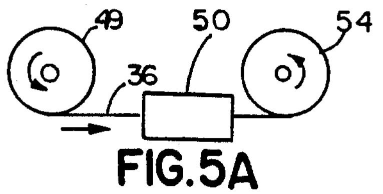
FIGS. 5A-5C are diagrammatic illustrations of the steps of a method for manufacturing the metallized labels according to the invention.
Figure 6A:
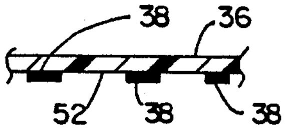
FIGS. 6A and 6B are sectional elevational views of partially manufactured labels according to the invention.
Figure 6B:
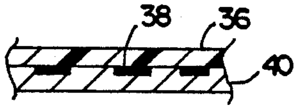

The manufacture of metallized labels according to the invention is illustrated in FIGS. 5A–5C, and FIGS. 6A and 6B. As shown in FIG. 5A, a feed roll 49 of a continuous web of base sheet material 36 is unrolled and passed through a printer 50 or other suitable marking device which deposits one or more series of the printed markings 38 on the rear surface of the base sheet web. Advantageously, the base sheet web may be provided in a width such that several longitudinal series of labels are printed side-by-side. Thus, as shown in FIG. 6A, the base sheet web 36 now carries printed markings 38 on its rear surface. The printed markings 38 define unprinted areas 52, or printed translucent viewing areas, through which the metallic layer will be visible. The printed base sheet web is taken up into roll 54.

The printed base sheet web roll 54 is then loaded into a metallizing device 56. Preferably, the metallizing device is a vacuum metallizing machine as is well known in the art. Suitable vacuum metallizing machines are available from the General Vacuum Equipment company of Atlas Converting Equipment P.L.C. of England. Such vacuum metallizing machines include a vacuum chamber 58 and an evaporator 60 which heats a supply of metal material, such as an aluminum wire, causing the metal to evaporate and condense on a web to form a thin metal layer. The printed base sheet web is unwound from roll 54 and passed through the evaporator 60 within the vacuum chamber 58. A thin metallic layer 40 is condensed on the rear surface of the base sheet web. The printed markings 38 are thus disposed between the base sheet 36 and the metallic layer 40 as shown in FIG. 40. The metallized web is then taken up into roll 62.

Figure 5B:
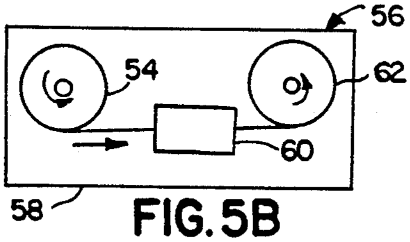
Figure 5C:
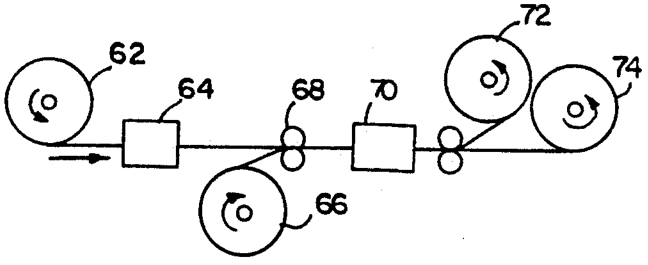

As shown in FIG. 5C, the roll 62 of the metallized, printed base sheet web is removed from the vacuum chamber. The roll 62 is unwound, and the web is passed through a coater 64 which places the coating of pressure sensitive adhesive 42 on the rear surface of the metallized web. A web 66 of release liner sheet is unwound and adhered to the adhesive coated rear surface of the web by pinch rollers 68. The web then passes through a die cutter 70 which cuts through to the release liner to form the discrete labels 32 on the release liner. If multiple series of labels across the width of the release liner are produced, a slitter may also be used to separate the web into rolls of single series of labels. The skeletal waste matrix of web material is taken up on roll 72. The release liner web with the series of finished labels is taken up into roll 74.

Figure 7:
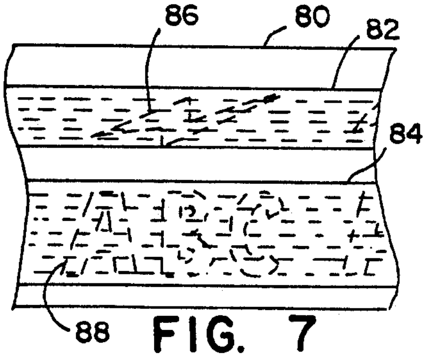
FIG. 7 is a fragmentary rear plan view of a base sheet web metallized in bands.

If the printed markings of the labels are arranged suitably, it is not necessary to metallize the entirety of the rear surface of the base sheet. As shown in FIG. 7, the rear surface of a web 80 of base sheet material may be metallized only in zones such as bands 82, 84 which lie in registration with the apertures 86, 88 formed by the printed markings on the base sheet. Such zones may run continuously and longitudinally along the length of the base sheet web, transversely in longitudinally spaced zones, or in patterns of discrete zones such as circles, rectangles, etc.

Thus, the above described invention provides a metallized label which eliminates the use, expense, and complexity of a protective cover sheet or varnish coating.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A label comprising:
a translucent base sheet having a front surface and a rear surface;
graphic printing directly engaging said base sheet and forming at least one viewing area; and
a metallic layer directly engaging said rear surface of said base sheet and said printing, said metallic layer being viewable through said base sheet and said viewing area, whereby the need for a cover sheet or varnish coating to protect said printing is eliminated.

2. The label of claim 1 wherein said metallic layer has a rear surface, and further comprising adhesive material on said rear surface of said metallic layer.

3. The label of claim 2 wherein said adhesive material has a rear surface, and further comprising a release liner temporarily adhered to said rear surface of said adhesive material whereby said label is carried on said release liner.

4. The label of claim 3 wherein said metallic layer is disposed only on a portion of said rear surface of said base sheet in correspondence with said at least one area through which said metallic layer is visible.

5. A label comprising:
a translucent base sheet having a front surface and a rear surface;
graphic printing directly on and engaging said rear surface of said base sheet and forming at least one viewing area, whereby neither a protective sheet nor a varnish coating is required to protect said printing;
a metallic layer directly on and engaging said rear surface of said base sheet and said printing, whereby said metallic layer is visible from the front of said base sheet through said at least one viewing area; and
adhesive directly on said metallic layer opposite said base sheet.

6. The label of claim 5 further comprising a release liner temporarily adhered to said adhesive material opposite said base sheet.

7. The label of claim 5 wherein said metallic layer is disposed only on a portion of said rear surface of said base sheet in correspondence with said at least one viewing area.

* * * * *